United States Patent

Fossum

[15] 3,650,361

[45] Mar. 21, 1972

[54] QUIET OPERATING ELECTROMAGNETIC CLUTCH OR BRAKE

[72] Inventor: Eric R. Fossum, Simsbury, Conn.

[73] Assignee: General Time Corporation

[22] Filed: May 28, 1970

[21] Appl. No.: 41,521

[52] U.S. Cl. ............................192/30 V, 74/574, 188/1 B, 192/84 C, 192/106.1
[51] Int. Cl. .................................F16d 27/10, F16f 15/12
[58] Field of Search ....................192/84 C, 106.1, 30 V; 188/1 B, 218 A, 250 E; 181/33 M; 74/443, 574

[56] References Cited

UNITED STATES PATENTS

| 2,919,776 | 1/1960 | Pierce | 192/84 C |
|---|---|---|---|
| 1,803,077 | 4/1931 | Spase | 74/574 X |
| 1,780,234 | 11/1930 | Johnston | 188/218 A |
| 1,791,495 | 2/1931 | Frey | 188/218 A |
| 2,012,838 | 8/1935 | Tilden | 188/218 A |
| 2,252,804 | 8/1941 | Gass | 181/33 M |
| 3,326,343 | 6/1967 | Stuckens et al. | 192/84 C |
| 2,029,515 | 2/1936 | Tower | 74/574 |

FOREIGN PATENTS OR APPLICATIONS

| 934,096 | 8/1963 | Great Britain | 188/1 B |

Primary Examiner—Allan D. Herrmann
Attorney—Pennie, Edmonds, Morton, Taylor and Adams

[57] ABSTRACT

This invention is directed to an electromagnetic drive mechanism comprising an armature, a rotor having a flange extending from the outer periphery thereof, and a shaft wherein the flange has randomly spaced slots therein and resilient drive means connect the rotor and shaft.

6 Claims, 4 Drawing Figures

Patented March 21, 1972 3,650,361

INVENTOR
ERIC R. FOSSUM

BY Pennie, Edmonds, Morton, Taylor & Adams
ATTORNEYS

QUIET OPERATING ELECTROMAGNETIC CLUTCH OR BRAKE

BACKGROUND OF THE INVENTION

Electromagnetic drive mechanisms such as clutches and brakes generally comprise a rotor mounted on a shaft between an armature and a field. Such devices are commonly used in data processing equipment for operations such as card sorting and the like. These are high speed operations and the drive mechanisms tend to chatter, squeak, and make other noises during engagement. It has long been desired to abate or eliminate this noise and various means have been suggested for this purpose. However, it has not been heretofore possible to obtain quiet operating electromagnetic clutches or brakes.

SUMMARY OF THE INVENTION

An electromagnetic drive mechanism has now been found which is essentially noise-free in operation.

Briefly stated, the present invention comprises an electromagnetic drive mechanism having a rotor with a flange extending from the outer periphery thereof, an armature, and resilient drive means connecting said rotor to a mating shaft, said flange having slots randomly spaced therein. In a preferred embodiment the mechanism also includes an electric member tightly fitted about the outer periphery of the rotor and flange.

DETAILED DESCRIPTION

Figure 1:
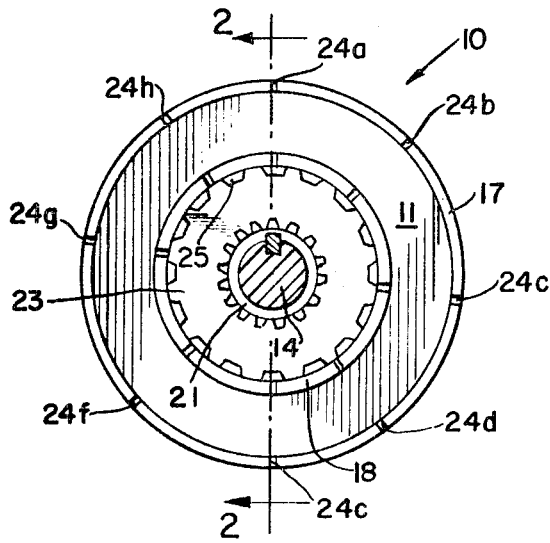
FIG. 1 is a front elevational view of a device of the present invention.
Figure 2:
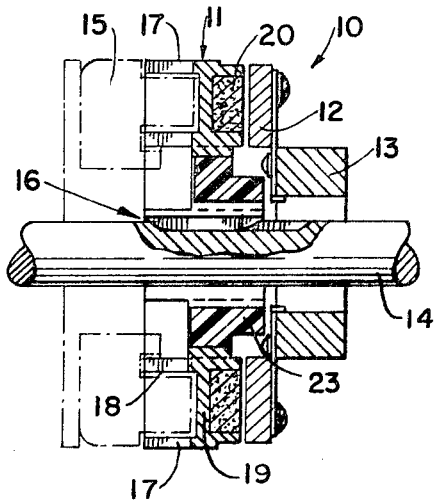
FIG. 2 is a sectional view taken along line 2—2 of FIG. 1.

While the instant invention is applicable as a clutch or brake, it will be described as a clutch. Referring to FIGS. 1 and 2 of the drawing, there is shown a drive mechanism 10 of the present invention comprising a rotor 11, an armature 12, armature hub 13, and a shaft 14. Operatively associated with the rotor 11 is a field 15 (shown only in broken line). The field 15, armature 14, and armature hub 13 are of conventional design.

The rotor 11 is connected to the shaft 14, as hereinafter described, and comprises a base plate 19, a central opening 16 therein with a female spline shape and circumferential flanges 17 and 18 extending from one side of the plate. Outer flange 17 extends axially from the outer periphery of the plate 19 and inner flange 18 extends axially from the plate about the central opening 16. The U-shaped pathway formed by the flanges and plate form a track for the field. The shape of the rotor 11 with its base plate 19 and extending flanges 17 and 18 approaches that of an annular bell and hereinafter when the rotor 11 is referred to as "bell-shaped," this structure is intended. The plate 19 has attached to the side opposite flanges 17 and 18 a ring 20 which comes in contact with the armature 12 during operation of the clutch.

Extending through opening 16 in the rotor 11 is shaft 14 having a small diameter male spline 21. The spline 21 is attached to the shaft by key 22. An annular splined bushing 23 is inserted between the small diameter male spline 21 on shaft 14 and the large diameter female spline 25 of the rotor 11. The bushing 23 is constructed of a resilient material such as rubber or one of the usual plastics (nylon, etc.) which acts to dampen any noise when the clutch or brake is engaged. The bushing 23 is preferably press-fitted to the rotor. It can also be bonded to the rotor or inserted between the rotor 11 and the shaft 14.

Figure 3:
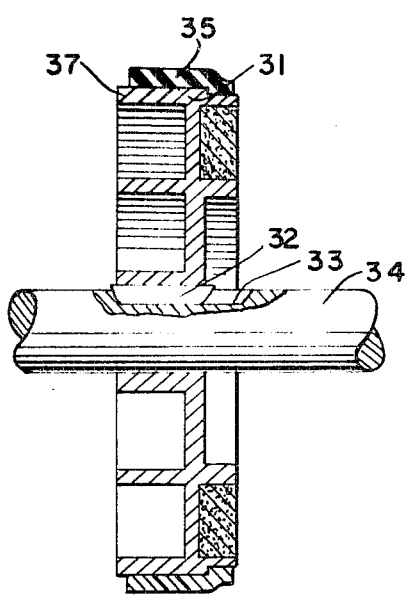
FIG. 3 is a sectional view of an alternate embodiment of the invention including an elastic member about the rotor.

The bushing 23 can be eliminated and resilient securing of the bell-shaped rotor to the shaft accomplished as shown in FIG. 3. As illustrated in this figure, a rotor 31 is driven directly to a shaft 34 by means of mating splines 32 and 33. The clearance of the spline teeth produces a backlash which effectively dampens out squeaking noises. In this embodiment it is also necessary that one of the mating spline members 32 or 33 be constructed of rubber or other resilient material.

As best illustrated in FIG. 1, the flanges 17 and 18 have a series of slots 24a–h therein extending almost to the plate 19. The slots 24 are randomly spaced in the flanges 17 and 18 and act to eliminate any resonance noises due to the bell shape of the rotor. The preferred spacing between the slots, as illustrated in FIG. 1, is 50° between slots 24a and b and slots 24e and f; 60° between slots 24b and c and slots 24f and g; 40° between slots 24c and d and slots 24g and h; and 30° between slots 24d and e and slots 24h and i.

Figure 4:
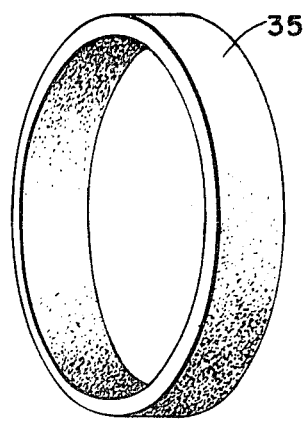
FIG. 4 is a perspective view of the elastic member.

In order to absorb any chatter in the clutch or brake an elastic member 35, such as the elastic band depicted in FIG. 4, is force fitted about the outer periphery of the rotor 31 and outer flange 37, as shown in FIG. 3. In like manner, an elastic band can also be fitted about the rotor 11 and flange 17 of the clutch illustrated in FIGS. 1 and 2.

The combination of the resilient drive connecting means and slotted flanges acts to dampen and eliminate the noises heretofore present in electromagnetic clutches or brakes. Inclusion of an elastic member about the rotor also acts to dampen any chatter or vibration.

The operation of the clutch as to the substantial elimination of any noise is largely evident from the description given. When the rotor is activated to drive the shaft the resilient nature of the connection therebetween acts to dampen or eliminate any squeaking noises that result if both connecting members are made of a rigid material such as steel. Also, the clearance of the spline teeth is such so as to produce a rotational backlash, thereby eliminating noise. The use of a double spline arrangement as shown in FIGS. 1 and 2, wherein the splined bushing is made of a resilient material, is even more effective in noise elimination.

Vibrational movement which can cause the bell-shape rotor to "ring" is counteracted by the asymmetric slots and preferably by also providing an elastic member about the outer periphery of the rotor and outer flange.

It will be understood that it is intended to cover all changes and modifications of the disclosure of the invention herein chosen for the purpose of illustration which do not constitute departures from the spirit and scope of the invention.

What is claimed is:

1. An electromagnetic drive mechanism comprising an armature, a rotor operatively associated therewith, a shaft passing through said rotor, resilient drive means connecting said shaft and said rotor, said rotor comprising a plate and a flange extending axially from the periphery thereof and having slots randomly spaced therein, and an elastic member tightly fitted about the outer periphery of said rotor.

2. The mechanism of claim 1 wherein said resilient drive means comprises a resilient splined bushing operatively spaced between said shaft and said rotor.

3. The mechanism of claim 2 including an elastic band force-fitted about the outer periphery of said rotor.

4. The mechanism of claim 1 wherein said resilient drive means comprises a female spline attached to said rotor and a mating male spline attached to said shaft, at least one of said splines being formed of a resilient material.

5. The mechanism of claim 4 including an elastic band force-fitted about the outer periphery of said rotor.

6. In an electromagnetic clutch or brake comprising a field, an armature, a rotor spaced between said field and armature and operatively associated therewith, and a shaft connected to said rotor, the improvement comprising a rotor comprising a plate having a central opening, a flange extending axially from the periphery thereof, and slots randomly spaced in said flange, a resilient splined bushing attached to said rotor in said central opening, a spline on sad shaft adapted to mate with the splines on said bushing, and an elastic band force-fitted about said rotor.